(12) United States Patent
Liu et al.

(10) Patent No.: US 12,142,134 B2
(45) Date of Patent: Nov. 12, 2024

(54) HAPTIC FEEDBACK SUBSTRATE, HAPTIC FEEDBACK APPARATUS AND HAPTIC FEEDBACK METHOD

(71) Applicants: Beijing BOE Technology Development Co., Ltd., Beijing (CN); BOE Technology Group Co., Ltd., Beijing (CN)

(72) Inventors: Xiaotong Liu, Beijing (CN); Yuju Chen, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 348 days.

(21) Appl. No.: 17/620,546

(22) PCT Filed: Feb. 26, 2021

(86) PCT No.: PCT/CN2021/078018
§ 371 (c)(1),
(2) Date: Dec. 17, 2021

(87) PCT Pub. No.: WO2022/178799
PCT Pub. Date: Jan. 9, 2022

(65) Prior Publication Data
US 2023/0154293 A1    May 18, 2023

(51) Int. Cl.
*G08B 6/00* (2006.01)
*G06F 3/01* (2006.01)
*G06F 3/02* (2006.01)

(52) U.S. Cl.
CPC .............. *G08B 6/00* (2013.01); *G06F 3/016* (2013.01); *G06F 3/0202* (2013.01)

(58) Field of Classification Search
CPC ......... G08B 6/00; G06F 3/016; G06F 3/0202; G06F 3/014
See application file for complete search history.

(56) References Cited

U.S. PATENT DOCUMENTS

| 2010/0153845 A1 | 6/2010 | Gregorio et al. |
| 2011/0090070 A1 | 4/2011 | Modarres et al. |

(Continued)

FOREIGN PATENT DOCUMENTS

| CN | 101523329 A | 9/2009 |
| CN | 102195514 A | 9/2011 |

(Continued)

OTHER PUBLICATIONS

CN 202180000353.X second office action.

(Continued)

*Primary Examiner* — Quan Zhen Wang
*Assistant Examiner* — Mancil Littlejohn, Jr.
(74) *Attorney, Agent, or Firm* — IPro, PLLC

(57) ABSTRACT

The present disclosure provides a haptic feedback substrate, a haptic feedback apparatus and a haptic feedback method. The haptic feedback substrate comprises an actuator and a plurality of vibration units connected to the actuator, wherein each vibration unit has a different inherent frequency, the actuator is configured to generate a vibration signal and drive the vibration unit with the inherent frequency being a target inherent frequency to resonate, and a difference between the target inherent frequency and a frequency of the vibration signal is less than or equal to a present threshold.

18 Claims, 12 Drawing Sheets

(56) References Cited

U.S. PATENT DOCUMENTS

2011/0216027 A1   9/2011  Kim et al.
2013/0194219 A1   8/2013  Modarres et al.
2019/0318590 A1*  10/2019 Bilal ........................ G08B 6/00

FOREIGN PATENT DOCUMENTS

| CN | 102762265 A    |   | 10/2012 |
|----|----------------|---|---------|
| CN | 103916050 A    | * | 7/2014  |
| CN | 105204687 A    |   | 12/2015 |
| CN | 110413099 A    |   | 11/2019 |
| CN | 111324204 A    |   | 6/2020  |
| CN | 112099667 A    |   | 12/2020 |
| EP | 2508963 A1     |   | 10/2012 |
| WO | 2013137547 A1  |   | 9/2013  |

OTHER PUBLICATIONS

Lu Xiang, et al. "Research on Tactile Feedback of Projective Capacitive Touchscreen Based on Soft Vibration." Journal of Logistical Engeineering University. 27.6 (Nov. 2011): 82-86.
CN 202180000353.X first office action.

* cited by examiner

HAPTIC FEEDBACK SUBSTRATE, HAPTIC FEEDBACK APPARATUS AND HAPTIC FEEDBACK METHOD

TECHNICAL FIELD

The present disclosure relates to the technical field of haptic feedback, in particular to a haptic feedback substrate, a haptic feedback apparatus and a haptic feedback method.

BACKGROUND

At present, haptic feedback is presented typically in two forms: global vibration form and local vibration form. In the global vibration form, a screen vibrates as a whole, and users obtain different touch senses with their fingers in different areas by regulating voltage pulse signals. In the local vibration form, only a specific part vibrates synchronously. The local vibration form is mainly applied to the scenarios such as wristbands.

According to related arts, multiple actuators (such as vibrating motors) are used to drive bases in different areas to vibrate to generate different sensing signals in the local vibration form. However, the configuration of multiple actuators occupies a large space and leads to a high cost, which is not beneficial to the portability of haptic feedback devices.

SUMMARY

The present disclosure discloses a haptic feedback substrate. The haptic feedback substrate comprises an actuator and a plurality of vibration units connected to the actuator, wherein each of the plurality of the vibration units has a different inherent frequency, the actuator is configured to generate a vibration signal and drive the vibration unit with the inherent frequency being a target inherent frequency to resonate, and a difference between the target inherent frequency and a frequency of the vibration signal is less than or equal to a preset threshold.

In an optional implementation, each of the plurality of the vibration units comprises a base, a cantilever and a mass block, the mass block is disposed at a center of the vibration unit, the base is disposed around the mass block and is connected to the mass block by the cantilever, and the actuator is disposed on a side of the base.

In an optional implementation, the base, the cantilever and the mass block are of an integrated structure.

In an optional implementation, the shape of the cantilever is a spiral, an inner circle of the spiral is connected to the mass block, and an outer circle of the spiral is connected to the base. an optional implementation, the spiral is an Archimedean spiral.

In an optional implementation, the cantilever is an L-shaped arm, a long arm of the L-shaped arm is connected to the base, and a short arm of the L-shaped arm is connected to the mass block.

In an optional implementation, the shape of the mass block is a polygon, and connection points of the L-shaped arm and the mass block are located at vertexes of the polygon.

In an optional implementation, the shape of the base is a polygon, and connection points of the cantilever and the base are vertexes of the polygon or midpoints of side edges of the polygon.

In an optional implementation, the vibration unit further comprises a ring structure disposed between the mass block and the base, and the ring structure encircles the mass block and is connected to the mass block by the cantilever.

In an optional implementation, in a normal direction of the ring structure encircling the mass block, a width of the ring structure is greater than or equal to 0.1 mm and less than or equal to 1 mm.

In an optional implementation, when a plurality of the ring structures are provided, a distance between two adjacent instances of the plurality of the ring structures is greater than or equal to 0.1 mm and less than or equal to 1 mm.

In an optional implementation, the quantity of the ring structures is less than or equal to 20.

In an optional implementation, in a direction parallel to a plane where the haptic feedback substrate is located, a diameter of the mass block is greater than or equal to 1 mm and less than or equal to 50 mm.

In an optional implementation, a first filler layer is disposed in gaps between the base, the cantilever and the mass block in the vibration unit, a Young modulus of the first filler layer is less than a Young modulus of the base, and a thickness of the first filler layer is less than or equal to a thickness of the base.

In an optional implementation, a second filler layer is disposed between the bases of two adjacent instances of the plurality of the vibration units, a Young modulus of the second filler layer is less than a Young modulus of the bases, and a thickness of the second filler layer is less than or equal to thickness of the bases.

In an optional implementation, a first fixing layer is disposed on a side, close to the actuator, of the base and is arranged close to a first edge of the base, the first edge is an edge, away from the mass block, of the base, the first fixing layer forms an evasion area on the base, the actuator is located in the evasion area, and a Young modulus of the first fixing layer is greater than a Young modulus of the base.

In an optional implementation, a second fixing layer is disposed on a side, away from the actuator, of the base and is arranged close to a first edge of the base, the first edge is an edge, away from the mass block, of the base, and a Young modulus of the second fixing layer is greater than a Young modulus of the base.

In an optional implementation, the actuator is at least one of a piezoelectric motor, a flat motor and a linear motor.

The present disclosure discloses a haptic feedback apparatus, comprising the above haptic feedback substrate.

The present disclosure discloses a haptic feedback method being applied to the above haptic feedback substrate, and the method comprises:

controlling the actuator to generate a vibration signal, and driving the vibration unit with an inherent frequency being a target inherent frequency to resonate, wherein a difference between the target inherent frequency and a frequency of the vibration signal is less than or equal to a preset threshold.

The aforesaid description is merely a brief summary of the technical solution of the present disclosure. To allow those skilled in the art to gain a better understanding of the technical means of the present disclosure so as to implement the present disclosure according to the contents in the specification and to make the above and other purposes, features and advantages of the present disclosure clearer, specific implementations of the present disclosure are given below.

BRIEF DESCRIPTION OF THE DRAWINGS

To more clearly explain the technical solutions of the embodiments of the present disclosure or the prior art, drawings used for describing the embodiments of the present disclosure or the prior arts will be briefly introduced below. Obviously, the drawings in the following description only illustrate some embodiments of the present disclosure, and those ordinarily skilled in the art can obtain other drawings according to the following ones without creative labor.

DETAILED DESCRIPTION

To clarify the purposes, technical solutions and advantages of the embodiments of the present disclosure, the technical solutions of the embodiments of the present disclosure will be clearly and completely described below in conjunction with the drawings of the embodiments of the present disclosure. Obviously, the embodiments in the following description are merely illustrative ones, and are not all possible ones of the present disclosure. All other embodiments obtained by those ordinarily skilled in the art based on the following ones without creative labor should also fall within the protection scope of the present disclosure.

Figure 1:
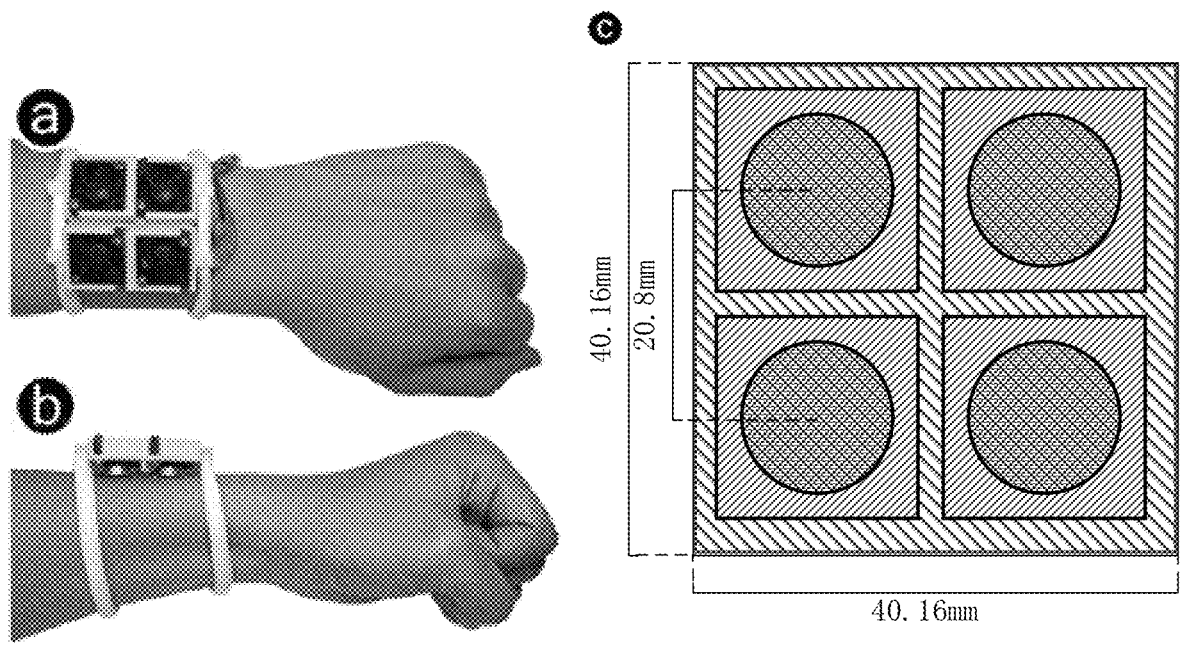
FIG. 1 illustrates a structural view of a haptic feedback device in related arts.

At present, the local haptic perception technique (such as wristbands) generally adopts multiple vibrating motors to drive different areas of a substrate to vibrate to generate local perceptual signals. As shown in FIG. 1, four vibrating motors are used to control four areas to vibrate separately to generate different haptic perceptual signals. The existing local haptic perception technique has the problems of large space occupation and high cost and is not beneficial to the probability of smart bracelets. So, how to realize local haptic perception with one actuator is an issue urgently to be settled by those skilled in the art.

Figure 2A:
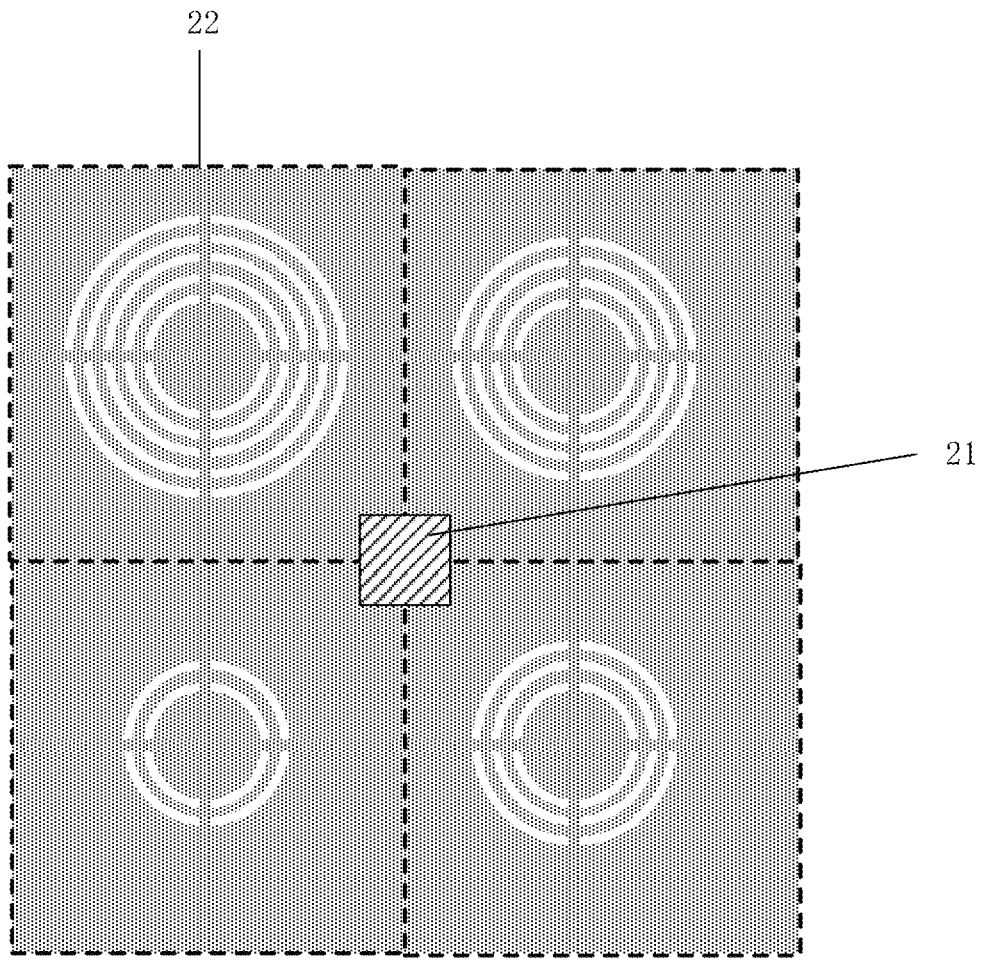
FIG. 2a illustrates a plan structural view of a first haptic feedback substrate according to one embodiment of the present disclosure.

To settle the above issue, one embodiment of the present disclosure provides a haptic feedback substrate. Referring to FIG. 2a, the haptic feedback substrate comprises an actuator 21 and multiple vibration units 22 connected to the actuator 21, wherein the vibration units 22 have different inherent frequencies, the actuator 21 is used to generate a vibration signal and drive the vibration unit 22 with the inherent frequency being a target inherent frequency to resonate, and a difference between the target inherent frequency and a frequency of the vibration signal is less than or equal to a preset threshold.

In this embodiment, the actuator 21 is a device capable of generating vibration signals such as a motor. The actuator 21 may be at least one of a piezoelectric motor, a flat motor and a linear motor, and this embodiment has no specific limitation in this aspect. When the piezoelectric motor is used as the actuator 21, the haptic feedback substrate is made light and thin.

In this embodiment, the multiple vibration units 22 may be located in different areas of the haptic feedback substrate separately, and are in contact connection with the actuator 21, that is, one actuator 21 is able to drive multiple vibration units 22 in contact connection with the actuator 21, such that the size of a touch feedback module is reduced. As shown in FIG. 2a, the haptic feedback substrate comprises four vibration units 22, that is, one actuator 21 is in contact connection with four vibration units 22 and is used to drive the four vibration units 22.

Figure 2B:
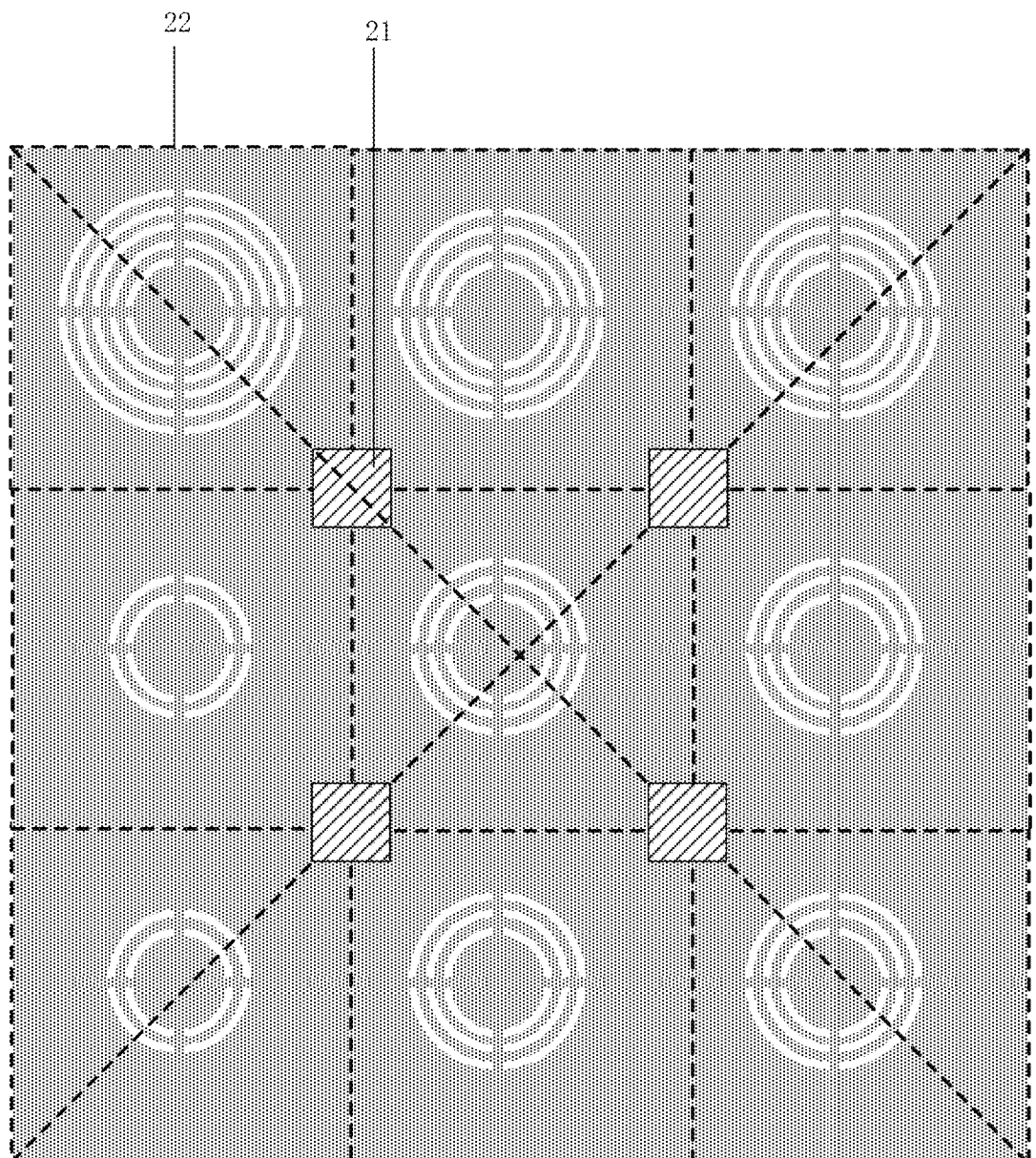
FIG. 2b illustrates a plan structural view of a second haptic feedback substrate according to one embodiment of the present disclosure.

It should be noted that the haptic feedback substrate in this embodiment may be rectangular, as shown in FIG. 2a and FIG. 2b. Referring to FIG. 2a, the haptic feedback substrate comprises 2*2 vibration units 22 arranged in an array, and one actuator 21 is disposed at the center of the rectangular haptic feedback substrate. Referring to FIG. 2b, the haptic feedback substrate comprises 3*3 vibration units 22 arranged in an array, one actuator 21 is disposed between two adjacent vibration units 22 on each diagonal line of the rectangular haptic feedback substrate, four actuators 21 are arranged totally and are the same or different in size and type, and the size and type of the actuators 21 depend on actual requirements. In addition, the haptic feedback substrate in this embodiment may comprise m*n vibration units 22, and the present disclosure has no limitation to the specific values of m and n. It should be noted that the multiple vibration units 22 do not necessarily arranged in an array, the specific arrangement of the multiple vibration units 22 may be designed according to actual requirements, and this embodiment has no limitation in this aspect.

Figure 2C:
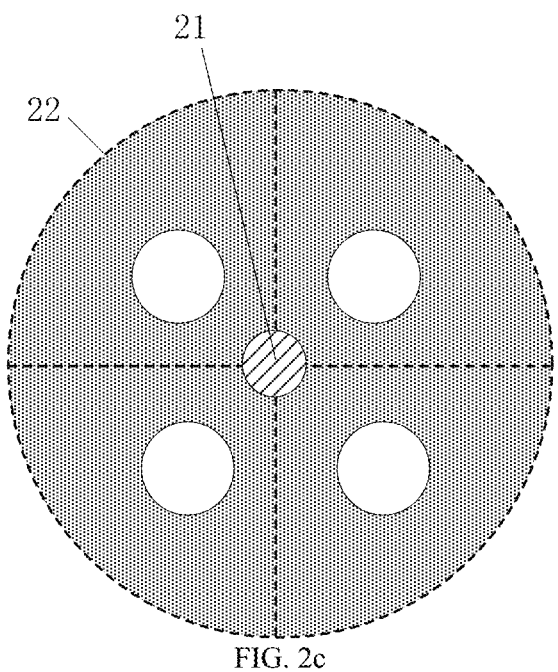
FIG. 2c is a plan structural view of a third haptic feedback substrate according to one embodiment of the present disclosure.
Figure 2D:
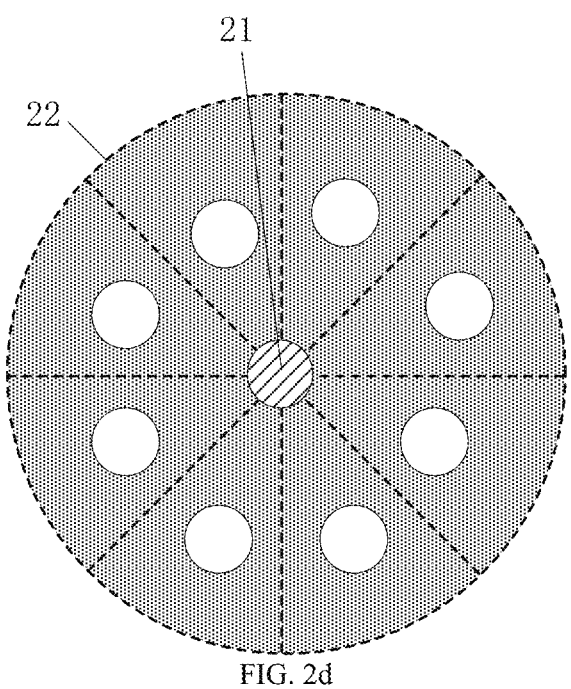
FIG. 2d illustrates a plan structural view of a fourth haptic feedback substrate according to one embodiment of the present disclosure.

The haptic feedback substrate in this embodiment may also be circular. As shown in FIG. 2c and FIG. 2d, multiple vibration units 22 are disposed in a circle around the center of the circular haptic feedback substrate, and one actuator 21 is disposed at the center of the circular haptic feedback substrate. In FIG. 2c, one actuator 21 corresponds to four vibration units 22; and in FIG. 2d, one actuator 21 corresponds to eight vibration units 22. When the haptic feedback substrate is circular, the actuator 21 is disposed at the center of the haptic feedback substrate to drive more vibration units 22, such that the size of the touch feedback module is further reduced. Wherein, the quantity of vibration units 22 corresponding to one actuator 21 may be set as the case may be, and this embodiment has no limitation in this aspect.

It should be noted that the haptic feedback substrate in this embodiment is not limited to the circular shape or the rectangular shape mentioned above, and may also be in other shapes such as oval, pentagonal and hexagonal, and this embodiment has no limitation in this aspect.

In specific implementation, regular patterns may be etched on the surface of glass, metal, plastic or other materials to make the vibration units 22 with specific inherent frequencies, and the specific structure of the vibration units 22 will be described in detail in subsequent embodiments.

In this embodiment, multiple vibration units 22 share one actuator 21, the actuator 21 is controlled to generate a vibration signal to drive the vibration unit 22, having the inherent frequency being close or equal to the frequency of the vibration signal, of the multiple vibration units 22 to resonate with the actuator 21, such that the vibration amplitude is improved; moreover, the other vibration units 22 will not resonate because of the large differences between the inherent frequencies of these vibration units 22 and the frequency of the vibration signal, and the vibration amplitude is reduced. In this way, all the vibration units 22 may be controlled independently to realize local haptic feedback.

Figure 3:
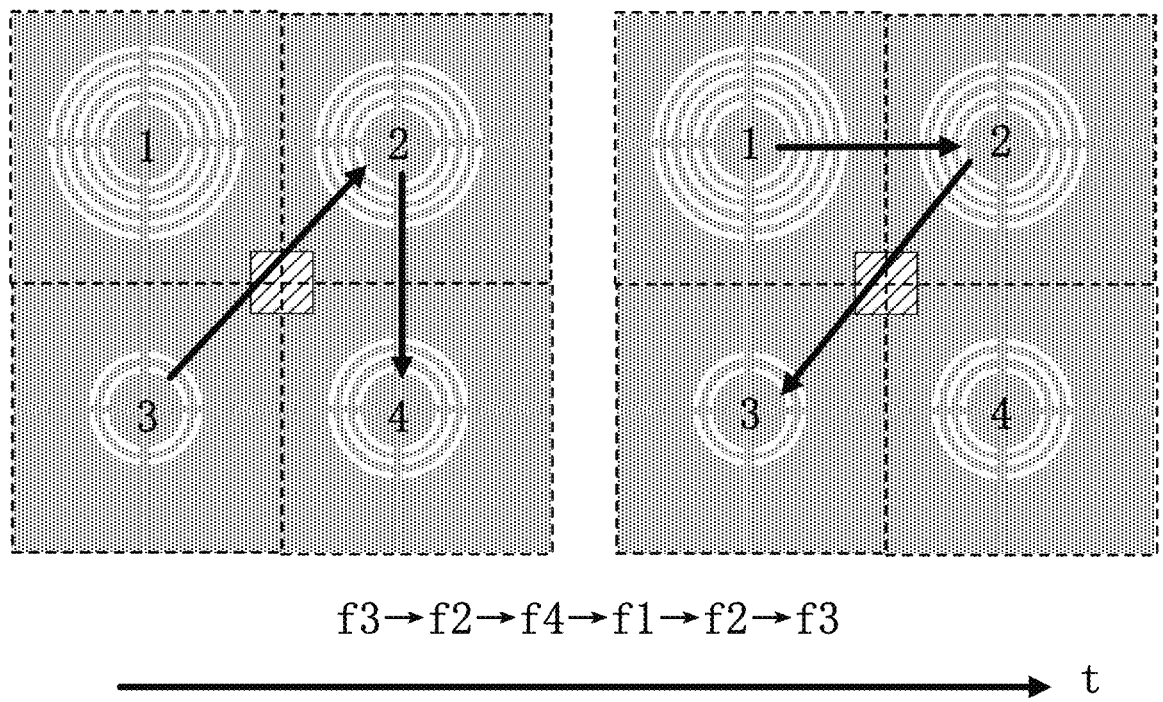
FIG. 3 illustrates a schematic diagram of a control process of a haptic feedback substrate according to one embodiment of the present disclosure.

In specific application, the vibration units 22 have different inherent frequencies, so the actuator may be controlled to sequentially generate vibration signals with different frequencies to realize local control and switching of the vibrations of the multiple vibration units to obtain different haptic perceptual signals. As shown in FIG. 3, the actuator 21 sequentially generates vibration signals with frequencies f3→f2→f4→f1→f2→f3 to drive the vibration units on the haptic feedback substrate to resonate in a direction shown by the arrows to generate haptic feedback signals. Wherein, f1 is the inherent frequency of the vibration unit 1 in FIG. 3, f2 is the inherent frequency of the vibration unit 2, f3 is the inherent frequency of the vibration unit 3, and f4 is the inherent frequency of the vibration unit 4. In this way, the actuator 21 sequentially generates vibration signals with different frequencies by time, and the haptic feedback substrate is able to generate different haptic perceptual signals.

According to the haptic feedback substrate in this embodiment, the actuator is controlled to generate a vibration signal, and then the vibration unit with the inherent frequency being close or equal to the frequency of the vibration signal is driven to resonate to improve the vibration amplitude, such that the vibration units are controlled independently to realize local haptic feedback. The vibration amplitude is improved by synchronous vibration, so the touch sense of the haptic feedback substrate in this embodiment is enhanced. In addition, because the vibration units have different inherent frequencies, the actuator may be controlled to sequentially generate vibration signals with different frequencies to realize local control and switching of the vibrations of the multiple vibration units to obtain different haptic perceptual signals. Local control may be realized without configuring an actuator for each vibration unit, such that the structural design of the haptic feedback substrate of the present disclosure is simplified, the size of the touch feedback module is reduced, the cost is reduced, and a touch feedback device is made more portable and intelligent.

It should be noted that to better independently and locally control the vibration units 22, a difference between the inherent frequencies of any two vibration units 22 in the haptic feedback substrate may be greater than the preset threshold. In actual application, the specific value of the difference between the inherent frequencies of the vibration units 22 and the specific value of the preset threshold may be set as actually needed, and the present disclosure has no limitation in this aspect.

In one optional embodiment, referring to FIG. 4 to FIG. 7, the vibration unit 22 may comprise a base 41, a cantilever 42 and a mass block 43, wherein the mass block 43 is disposed at the center of the vibration unit 22, the base 41 is disposed around the mass block 43 and is connected to the mass block 43 by the cantilever 42, and the actuator 21 is disposed on one side of the base 41.

Figure 7:
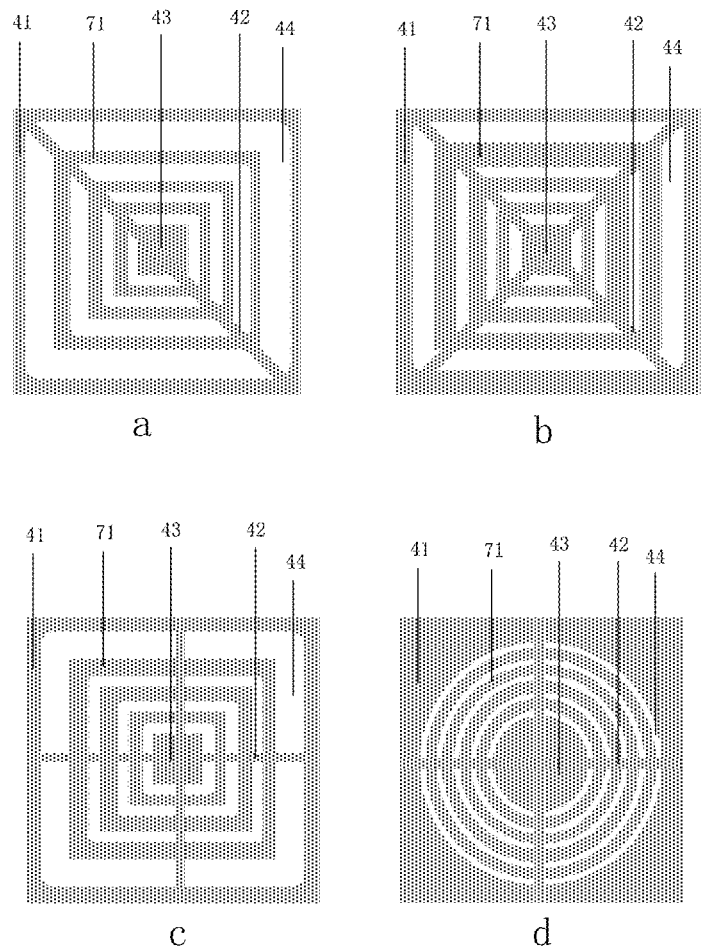
FIG. 7 illustrates a structural view of a fourth vibration unit according to one embodiment of the present disclosure.

In this embodiment, the cantilever 42, the mass block 43, and a ring structure 71 shown in FIG. 7 constitute a microstructure of the vibration unit 22. In actual application, the actuator 21 is located on the base 41 of the vibration unit 22, and to avoid signal interference, the actuator 21 is prevented against contact with the microstructure, as shown in FIG. 2a.

In this embodiment, the base 41, the cantilever 42 and the mass block 43 may be of an integrated structure. In specific implementation, the base 41 and the microstructure with a specific pattern may be made by machining a substrate with lasers, etchants, or the like. Wherein, the substrate may be made of polycarbonate, glass, polymethyl methacrylate, beryllium copper, stainless steel, or the like, and this embodiment has no limitation in this aspect.

The inventor finds, according to simulation results, that the microstructures provided with specific patterns etched on the surface of the substrate are made to correspond to different inherent frequencies by changing the parameters of the microstructures such as the line width, spacing and revolutions and the haptic feedback substrate may be controlled to vibrate locally by applying vibration signals with different frequencies to the vibration units 22 with the microstructures by the actuator 21, such that local haptic feedback is realized.

Figure 8:
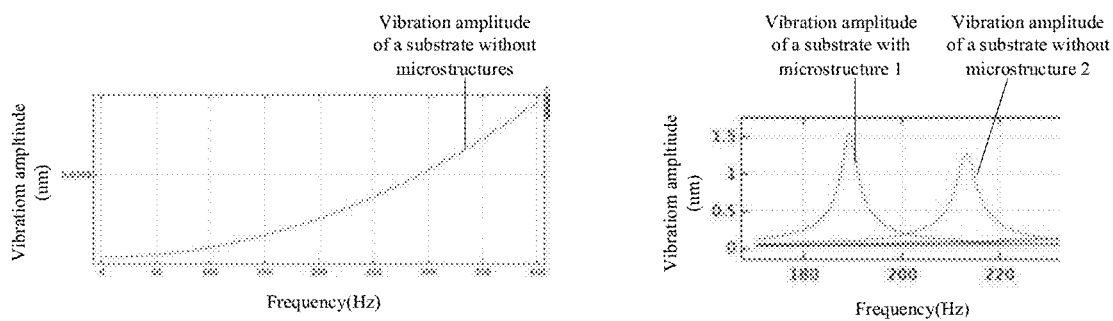
FIG. 8 illustrates a comparison diagram of the vibration amplitudes of substrates with microstructures according to one embodiment of the present disclosure and the vibration amplitude of a substrate without microstructures.

FIG. 8 illustrates a comparison diagram of the vibration amplitudes of substrates with two microstructures (microstructure 1 and microstructure 2) and the vibration amplitude of a substrate without a microstructure under the condition that the substrates are made of the same material and the frequencies of drive signals are the same. As can be seen from FIG. 8, the vibration amplitudes of the substrates with the microstructures are improved (both greater than 1 μm), and the vibration amplitude of the substrate without the microstructure is small (less than 0.1 μm). So, by etching some patterns of specific shapes on the substrate (resonator), a local vibration effect may be realized to obtain different haptic perceptual signals by controlling the frequencies of vibration signals generated by the actuator 21, and thus, the size and cost of a haptic feedback apparatus are reduced.

In specific implementation, in a direction parallel to a plane where the haptic feedback substrate is located, the size of the mass block 43 may be greater than or equal to 1 mm and less than or equal to 50 mm. The mass block 43 may be circular, polygonal (triangular, quadrangular, pentagonal, hexagon, or the like), oval, and the like, and this embodiment has no limitation in this aspect.

In this embodiment, the outer contour of the base 41 may be circular, polygonal (triangular, quadrangular, pentagonal, hexagon, or the like), oval, and the like, and this embodiment has no limitation in this aspect. In FIG. 4 to FIG. 7, the outer contour of the base 41 is square.

Figure 4:
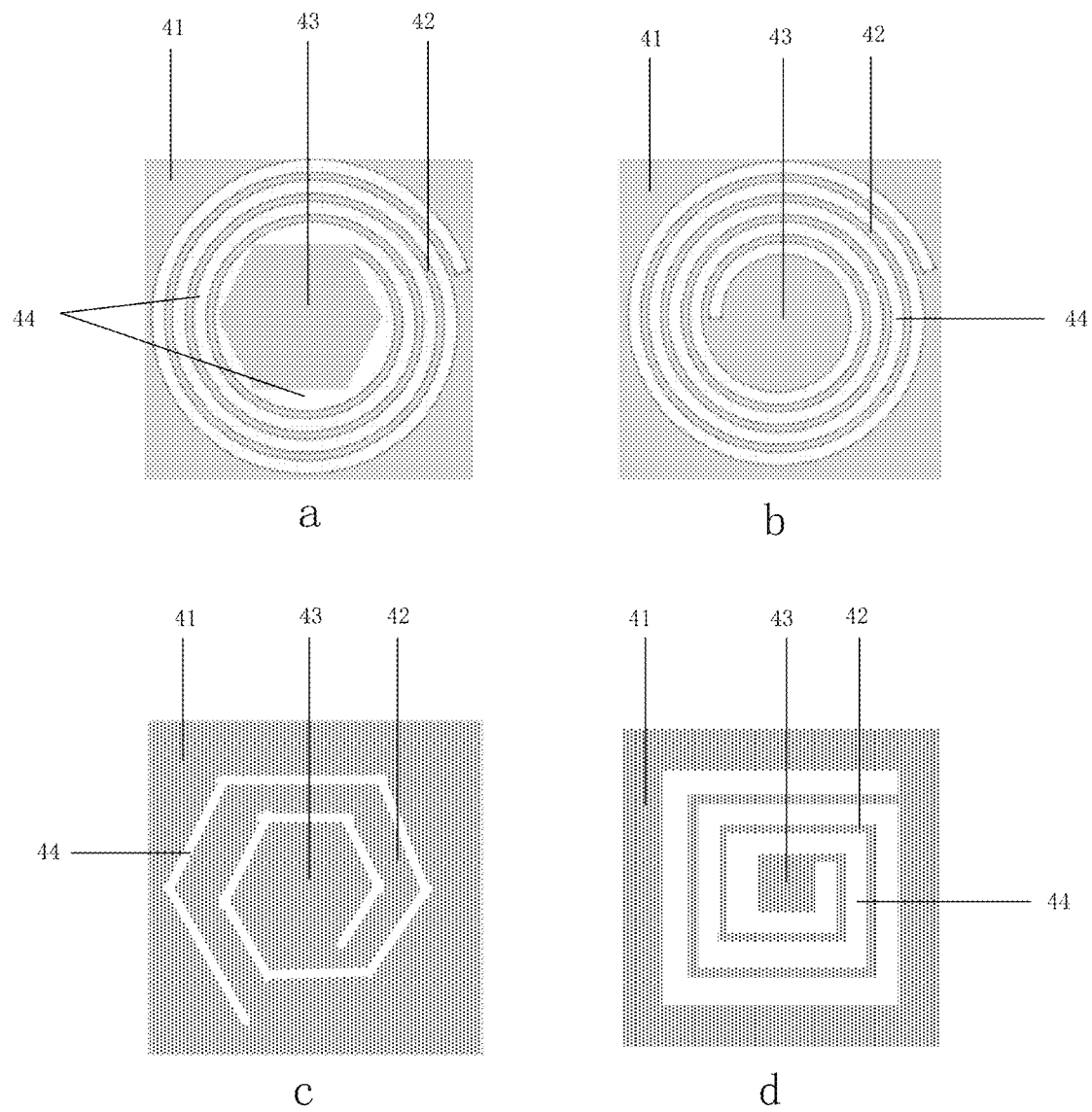
FIG. 4 illustrates a structural view of a first vibration unit according to one embodiment of the present disclosure.

Referring to FIG. 4, the cantilever 42 may be shaped like a spiral, wherein an inner circle of the spiral is connected to the mass block 43, and an outer circle of the spiral is connected to the base 41.

In specific implementation, the spiral is an Archimedean spiral, as illustrated by a, b and c in FIG. 4. Regarding a and b in FIG. 4, the coordinates of points on the pattern of the cantilever 42 or on an etched pattern meet a polar coordinate equation of the Archimedean spiral: $r=m+n\Theta$, wherein m is the distance from an initial etching point to a polar coordinate origin, m and n are both preset real numbers, and the polar coordinate origin is the central point of the mass block 43. Regarding c in FIG. 4, the pattern of the cantilever 42 or the etched pattern is divided into k segments, the central point of each segment is located on the Archimedean spiral, and the coordinates of the central point of each segment meet the polar coordinate equation of the Archimedean spiral: $r=m+n\Theta$, wherein m is the distance from an initial etching point to a polar coordinate origin, m and n are both preset real numbers, and the polar coordinate origin is the central point of the mass block 43. By dividing the spiral into k segments, the fabrication process may be simplified. Wherein, the value of k depends on actual requirements, and the present disclosure has no limitation in this aspect.

Figure 5:
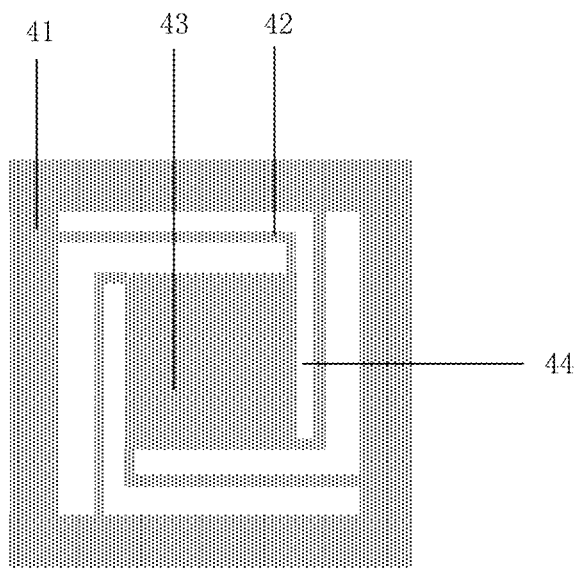
FIG. 5 illustrates a structural view of a second vibration unit according to one embodiment of the present disclosure.

Referring to FIG. 5, the cantilever 42 may be an L-shaped arm, wherein a long arm of the L-shaped arm is connected to the base 41, and a short arm of the L-shaped arm is connected to the mass block 43. When the shape of the mass block 43 is a polygon, connection points of the L-shaped arm and the mass block 43 may be located at the vertexes of the polygon.

As shown in FIG. 5, the mass block 43 is square, the short arms of four L-shaped arms are connected to four vertexes of the mass block 43 respectively, and the long arms of the four L-shaped arms are connected to the base 41.

Figure 6:
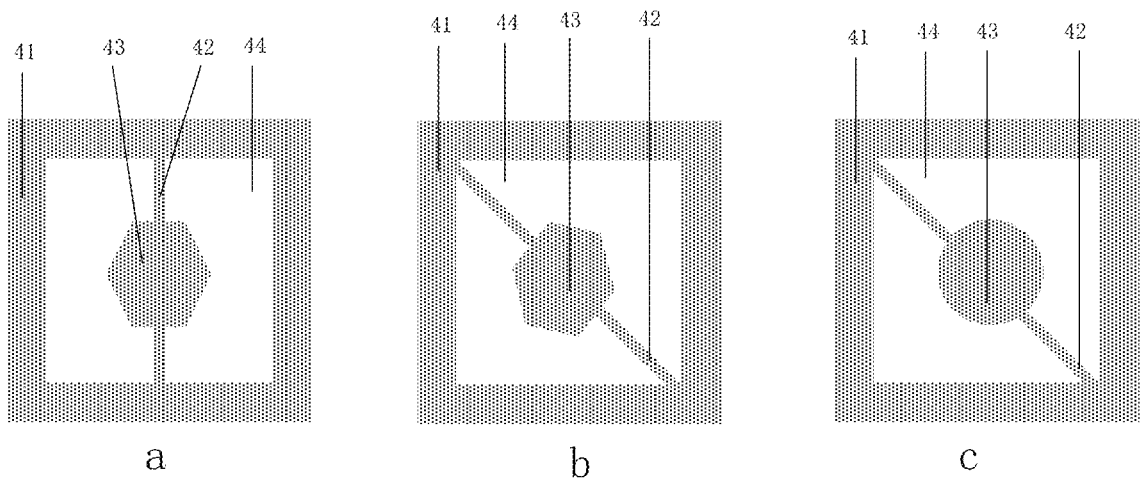
FIG. 6 illustrates a structural view of a third vibration unit according to one embodiment of the present disclosure.

Referring to FIG. 6 and FIG. 7, the cantilever 42 may be linear, one end of the linear cantilever 42 is connected to the mass block 43, and the other end of the linear cantilever 42 is connected to the base 41. When the shape of the base 41 is a polygon (for example, the base 41 shown in FIG. 6 and FIG. 7 is square), connection points of the cantilever 42 and the base 41 may be the vertexes of the polygon (as illustrated by b and c in FIG. 6, and by a and b in FIG. 7) or the midpoints of side edges of the polygon (as illustrated by a in FIG. 6, and by c and d in FIG. 7).

Referring to FIG. 7, the vibration unit 22 may further comprise a ring structure 71 disposed between the mass block 43 and the base 41, and the ring structure 71 encircles the mass block 43 and is connected to the mass block 43 by the cantilever 42. Wherein, the ring structure 71 may be a closed structure encircling the mass block 43 with the mass block 43 as the center.

The ring structure 71 may be in the same shape as the mass block 43. As illustrated by a, b and c in FIG. 7, the mass block 43 is square, and the ring structure 71 is also square and encircles the mass block 43. As illustrated by d in FIG. 7, the mass block 43 is circular, and the ring structure 71 is also circular and encircles the mass block 43.

In specific implementation, in a normal direction of the ring structure 71 encircling the mass block 43, the width of the ring structure 71 may be greater than or equal to 0.1 mm and less than or equal to 1 mm.

When multiple ring structures 71 are configured, the distance between every two adjacent ring structures 71 may be greater than or equal to 0.1 mm and less than or equal to 1 mm. Wherein, the multiple ring structures 71 may share the same center. For example, the multiple ring structures 71 take the mass block 43 as the center.

The quantity of the ring structures 71 may be less than or equal to 20, and this embodiment has no limitation in this aspect. The three vibration units shown in FIG. 6 are not provided with the ring structure 71, the vibration units illustrated by a, b and c in FIG. 7 are provided with three ring structures 71, and the vibration unit illustrated by d in FIG. 7 is provided with four ring structures 71.

The inventor finds, by simulation, that the inherent frequency of the vibration unit 22 will be decreased with the increase of the quantity of the ring structures 71 and will be increased with the increase of the width of the ring structures 71, and that the inherent frequency of the vibration unit 22 will be decreased with the increase of the distance between the ring structures 71. For example, if the width of the ring structures 71 is 0.5 mm, the corresponding inherent frequency is 3308 Hz and 2667 Hz respectively when the quantity of the ring structures 71 is 2 and 3. If the width of the ring structures 71 is 0.3 mm, the corresponding inherent frequency is 3607 Hz and 2980 Hz respectively when the quantity of the ring structures 71 is 2 and 5.

When the widths of the ring structures 71 and the distances between the ring structures 71 are 0.1 mm-1 mm and the quantity of the ring structures 71 is 0-20, the corresponding inherent frequency of the vibration unit 22 is 1-5 kHz. It should be noted that the widths of the multiple ring structures 71 are the same or different and the distances between the multiple ring structures 71 may be the same or different, and this embodiment has no limitation in this aspect.

It should be noted that the microstructure in the vibration unit 22 may be a hollowed-out structure penetrating through the substrate or a non-hollowed-out structure which is merely etched by a certain depth, and the present disclosure has no limitation in this aspect. In addition, the vibration unit 22 is not limited to the several structures shown in FIG. 4 to FIG. 7, the specific structure of the vibration unit 22 depends on actual requirements, and this embodiment has no limitation to the specific structure of the vibration unit 22.

In this embodiment, to prevent foreign matter and dust from entering the haptic feedback substrate via gaps between the base 41, the cantilever 42, the mass block 43 and the ring structure 71 in the vibration unit 22, as one optional implementation, a first filler layer is disposed in the gaps 44 in the vibration unit 22 as shown in FIG. 4 to FIG. 7, the Young modulus of the first filler layer is less than that of the base 41, and the thickness of the first filler layer is less than or equal to that of the base 41.

In specific implementation, when the patterns are etched on the substrate, if the gaps 44 are completely hollowed-out structures, the hollowed-out portions may be filled with a substance with a small Young modulus such as polydimethylsiloxane (PDMS) or rubber. If the gaps 44 are merely etched by a certain depth and do not form completely hollowed-out structures, the actuator 21 may be disposed on a side with the microstructure, and a side, away from the actuator, of the haptic feedback substrate may be disposed outwards (such as in contact with wrist skin), such that foreign matter and dust can also be prevented from entering the haptic feedback substrate.

Figure 9:
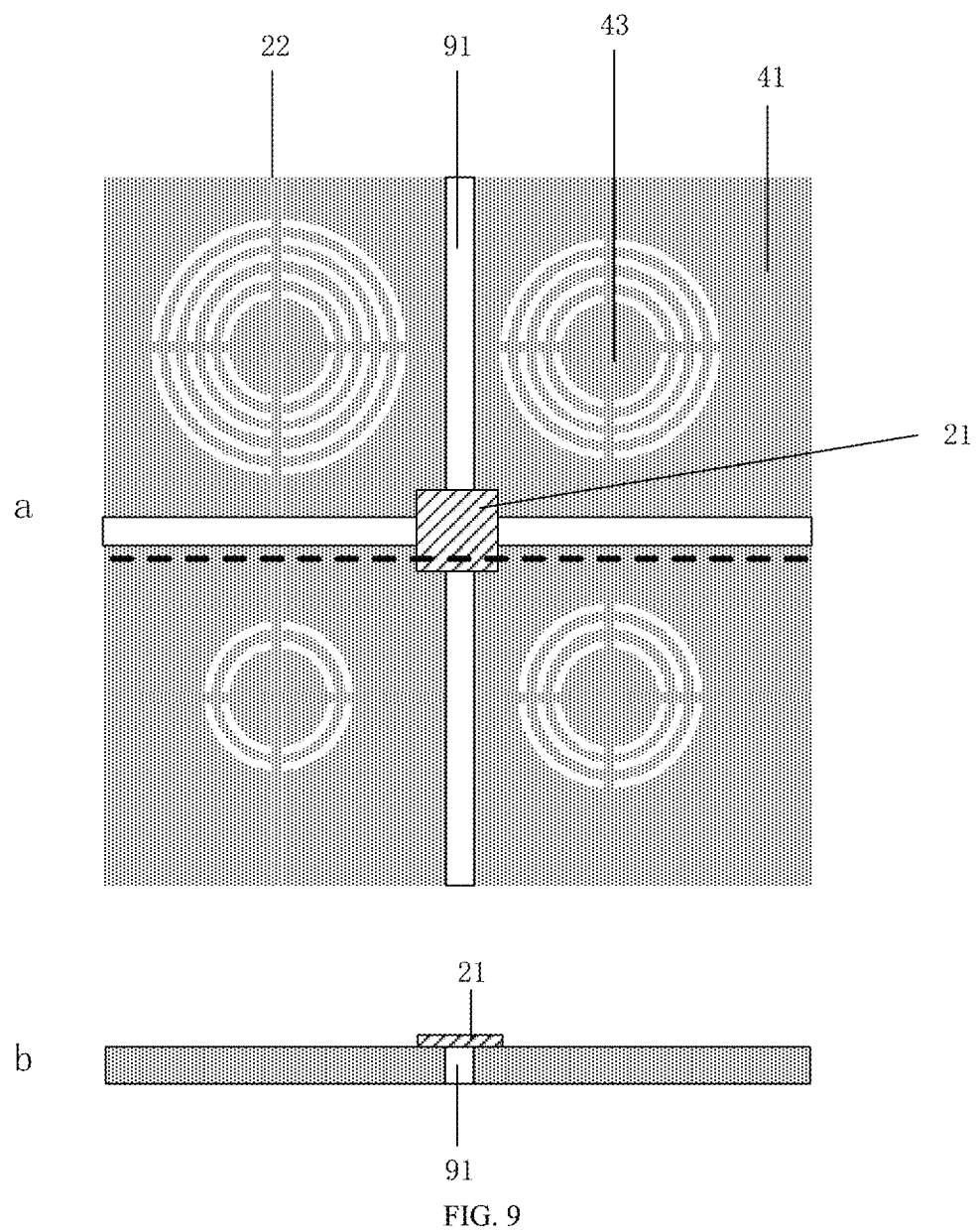
FIG. 9 illustrates a structural view of a first haptic feedback substrate according to one embodiment of the present disclosure.

In one optional embodiment, to prevent mutual interference between adjacent vibration units during the vibrating process, a second filler layer 91 is disposed between the bases 41 of every two adjacent vibration units 22, as shown in FIG. 9, wherein the Young modulus of the second filler layer 91 is less than that of the bases 41, and the thickness of the second filler layer 91 is less than or equal to that of the bases 41. Wherein, a in FIG. 9 illustrates a plan view of the haptic feedback substrate in this embodiment, and a sectional structural view of the part marked by the dotted line is illustrated by b in FIG. 9.

In specific implementation, a substance with a small Young modulus such as PDMS or rubber may be filled between the bases 41 of two adjacent vibration units 22, and the second filler layer 91 with a small Young modulus is disposed between two adjacent vibration units 22 to fulfill a buffer effect, such that vibration interference between the adjacent vibration units 22 is reduced, and the vibrations of the adjacent vibration units 22 are isolated.

Figure 10:
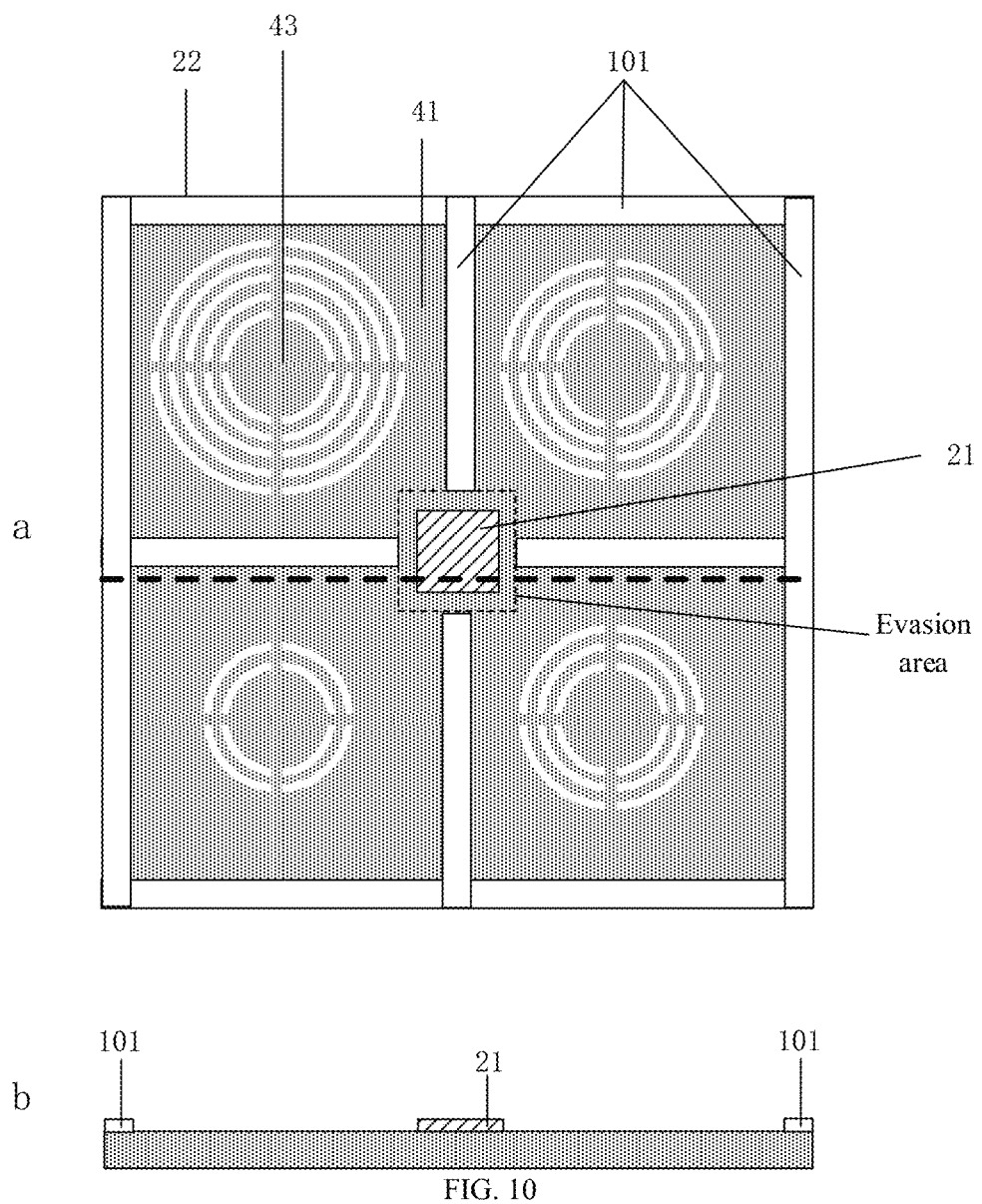
FIG. 10 illustrates a structural view of a second haptic feedback substrate according to one embodiment of the present disclosure.

Referring to FIG. 10, a first fixing layer 101 is disposed on a side, close to the actuator 21, of the base 41 and is arranged close to a first edge of the base 41, the first edge is an edge, away from the mass block 43, of the base 41, the first fixing layer 101 forms an evasion area on the base 41, the actuator 21 is located in the evasion area, and the Young modulus of the first fixing layer 101 is greater than that of the base 41. Wherein, a in FIG. 10 illustrates a plan structural view of the haptic feedback substrate in this embodiment, and a sectional structural view of the part marked by the dotted line is illustrated by b in FIG. 10.

As shown in FIG. 10, the first fixing layer 101 is close to the first edge of the base 41 and surrounds the microstructure (including the mass block, the ring structure, the cantilever, and the like), and the first fixing layer 101 and the actuator 21 are disposed on the same side, such that the first fixing layer 101 forms the evasion area, corresponding to the actuator 21, on the surface of the base 41, and the actuator 21 is disposed in the evasion area.

The first fixing layer 101 disposed on the surface close to the first edge of the base 41 is made of a rigid material with a high Young modulus, such that the vibration amplitude of the first edge of the base 41 is decreased, and thus, vibration interference between adjacent vibration units 22 is reduced.

Figure 11:
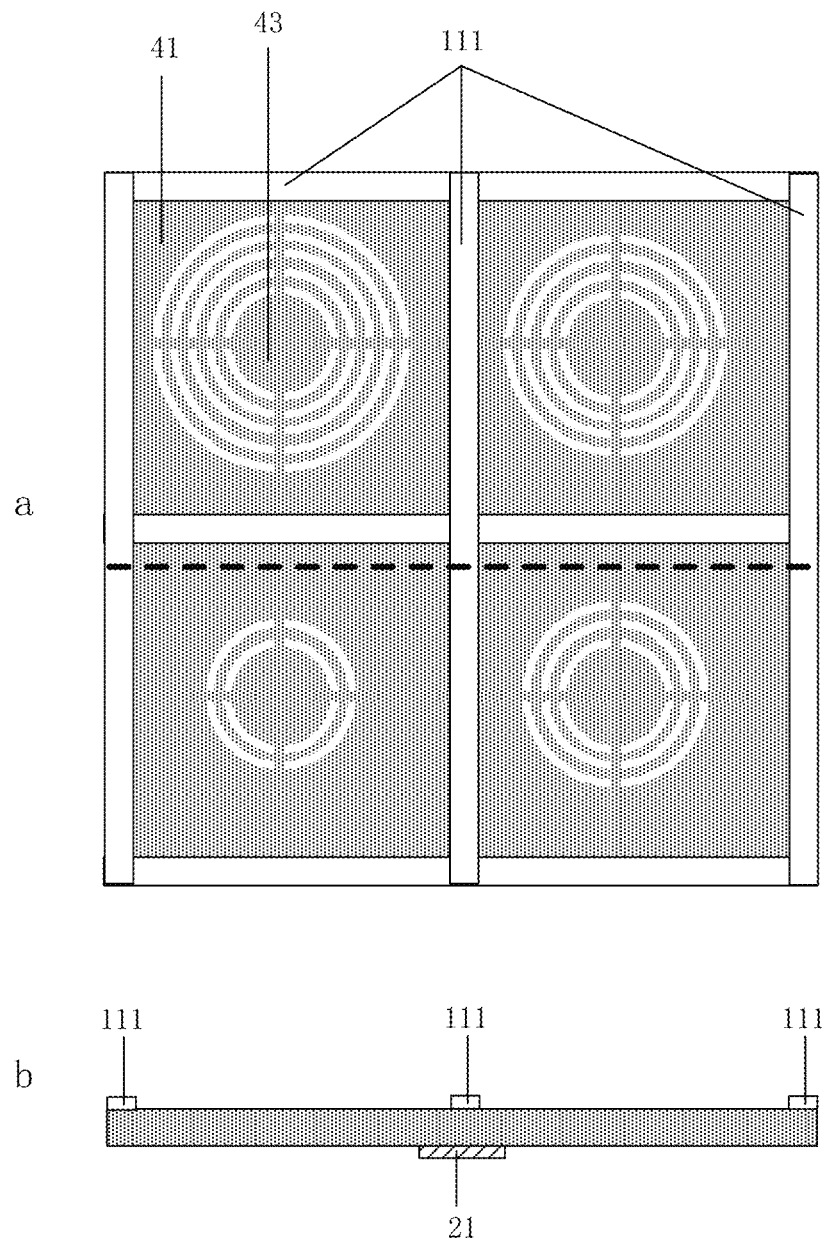
FIG. 11 illustrates a structural view of a third haptic feedback substrate according to one embodiment of the present disclosure.

Referring to FIG. 11, a second fixing layer 111 is disposed on a side, away from the actuator 21, of the base 41 and is arranged close to a first edge of the base 41, the first edge is an edge, away from the mass block 43, of the base 41, and the Young modulus of the second fixing layer 111 is greater than that of the base 41. Wherein, the second fixing layer 111 may be a closed structure encircling the mass block 43. Wherein, a in FIG. 11 illustrates a plan structural view of the haptic feedback substrate in this embodiment, and a sectional structural view of the part marked by the dotted line is illustrated by b in FIG. 11.

As shown in FIG. 11, the second fixing layer 111 is close to the first edge of the base 41 and surrounds the microstructure (including the mass block, the ring structure, the cantilever, and the like), and the first fixing layer 101 and the actuator 21 are disposed on different sides, such that the second fixing layer 111 forms a closed mechanism, encircling the microstructure, on the surface of the base 41. The second fixing layer 111 disposed on the surface close to the first edge of the base 41 is made of a rigid material with a high Young modulus, such that the vibration amplitude of the first edge of the base 41 is decreased, and thus, vibration interference between adjacent vibration units 22 is reduced.

The inventor finds, by simulating the haptic feedback substrates in FIG. 9 to FIG. 11, that when the actuator 21 sequentially generates vibration signals with different frequencies, the vibration signals with different frequencies drive different vitiation units to vibrate respectively, such that mutual interference between adjacent vibration units is avoided or may be ignored.

One embodiment of the present disclosure further provides a haptic feedback apparatus comprising the haptic feedback substrate in any one of the above-mentioned embodiments.

Wherein, the haptic feedback apparatus may be a wearable device such as a bracket, a wristband or a watch, or a keyboard such as a virtual keyboard or a solid keyboard, and this embodiment has no limitation in this aspect.

Figure 12:
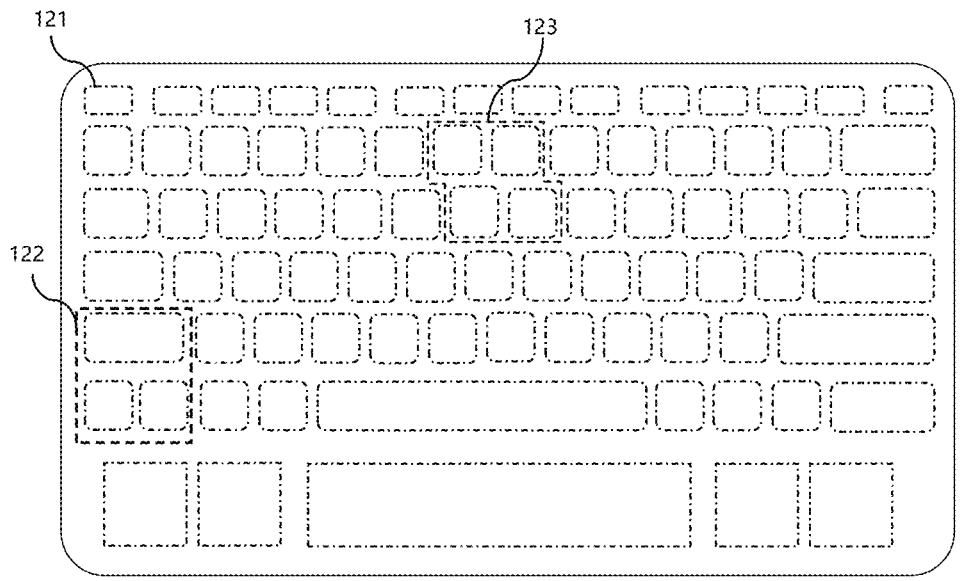
FIG. 12 illustrates a structural view of a haptic feedback apparatus according to one embodiment of the present disclosure.
Figure 13:
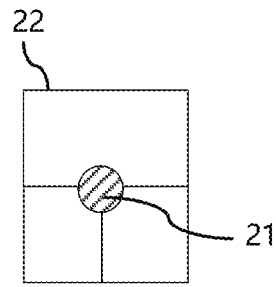
FIG. 13 illustrates a schematic diagram of the positional relationship between an actuator and keys of a keyboard according to one embodiment of the present disclosure.
Figure 14:
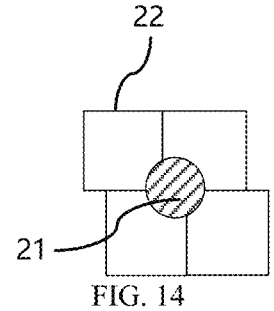
FIG. 14 illustrates a schematic diagram of another positional relationship between the actuator and the keys of the keyboard according to one embodiment of the present disclosure.

Referring to FIG. 12 which illustrates a structural view of a haptic feedback apparatus, the haptic feedback apparatus is a keyboard. In specific implementation, different vibration units may be disposed at the positions of keys 121 on the keyboard. An actuator may be disposed according to the relative positions of the multiple vibration units. For example, for a first vibration unit group 122 comprising three keys 121, three vibration units may be arranged correspondingly. The relative positional relationship between the three vibration units 22 in the first vibration unit group 122 and the actuator 21 is shown in FIG. 13. For a second vibration unit group 123 comprising four keys 121, four vibration units may be arranged correspondingly. The relative positional relationship between the four vibration units 22 in the second vibration unit group 123 and the actuator 21 is shown in FIG. 14. Wherein, the actuator 21 is disposed on a side, away from a touch surface, of the haptic feedback substrate.

As can be seen from FIG. 13 and FIG. 14, the vibration units 22 may be identical or different in size, and the specific size of the vibration units 22 depends on actual requirements. In addition, the actuator 21 may be circular, rectangular, square, or the like, and this embodiment has no limitation in this aspect.

Figure 15:
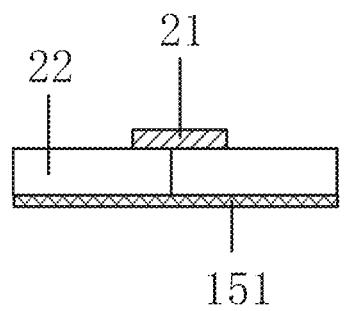
FIG. 15 illustrates a structural view of a haptic feedback substrate attached with a flexible film according to one embodiment of the present disclosure.

In specific implementation, referring to FIG. 15, a flexible film 151 may be disposed on the surface of the side, away from the actuator 21, of the haptic feedback substrate to protect the haptic feedback substrate against wear and prevent foreign matter from entering the haptic feedback substrate. Wherein, the flexible film 151 may be a polyimide (PI) film, a polyethylene terephthalate (PET) film, a polycarbonate (PC) film, or the like, and the thickness of the flexible film may be greater than or equal to 1 μm and less than or equal to 1 mm. This embodiment has no specific limitation to the material and thickness of the flexible film 151.

It should be noted that the flexible film 151 may be attached to an operating surface of the haptic feedback substrate such as a surface touched by fingers.

One embodiment of the present disclosure further provides a haptic feedback method applied to the haptic feedback substrate in any one of the above-mentioned embodiments. The haptic feedback method comprises: controlling an actuator to generate a vibration signal, and driving a vibration unit with an inherent frequency being a target inherent frequency to resonate, wherein a difference between the target inherent frequency and a frequency of the vibration signal is less than or equal to a preset threshold.

In specific implementation, the actuator may be controlled to sequentially generate vibration signals with different frequencies to realize local control and switching of the vibrations of multiple vibration units to obtain different haptic perceptual signals.

The embodiments of the present disclosure provide a haptic feedback substrate, a haptic feedback apparatus and a haptic feedback method. Wherein, the haptic feedback substrate comprises an actuator and multiple vibration units connected to the actuator, the vibration units have different inherent frequencies, and the actuator is used to generate a vibration signal and drive the vibration unit with an inherent frequency being a target inherent frequency to resonate, wherein a difference between the target inherent frequency and a frequency of the vibration signal is less than or equal to a preset threshold. According to the technical solution of the present disclosure, the actuator is controlled to generate a vibration signal to drive the vibration unit with an inherent frequency being close or equal to the frequency of the vibration signal to resonate to improve the vibration amplitude to fulfill local control over the vibration units, such that local haptic feedback is realized. In addition, because the vibration units have different inherent frequencies, the actuator may be controlled to sequentially generate vibration signals with different frequencies to realize local control and switching of the vibrations of the multiple vibration units to obtain different haptic perceptual signals. Local control can be realized without configuring an actuator for each vibration unit, such that the structural design of the haptic feedback substrate is simplified, the size of a touch feedback module is reduced, the cost is reduced, and a touch feedback device is made more portable and intelligent.

The embodiments in this specification are described progressively, the differences from other embodiments are emphatically stated in each embodiment, and the similarities of these embodiments may be cross-referenced.

Finally, it should be noted that relational terms such as "first" and "second" in this specification are merely used to distinguish one entity or operation from the other one, and do not definitely indicate or imply that these entities or operations have any actual relations or sequences. In addition, the term "comprise" or "include" or other variations are intended to refer to non-exclusive inclusion, so that a process, method, commodity or device comprising a series of elements not only comprises these elements listed, but also comprises other elements that are not clearly listed, or inherent elements of the process, method, commodity or device. Unless otherwise clearly specified, an element defined by the expression "comprise a" shall not exclusive of other identical elements in a process, method, commodity or device comprising said element.

The haptic feedback substrate, the haptic feedback apparatus, and the haptic feedback method provided by the present disclosure are described in detail above. Specific examples are used in the disclosure to illustrate the principles and implementations of the present disclosure. The description of the above embodiments is only used to help understand the methods and core ideas of the present disclosure; at the same time, for those of ordinary skill in the art, according to the ideas of the present disclosure, there will be changes in the specific implementation and scope of present disclosure. In summary, the content of this specification should not be construed as a limitation on the present disclosure.

"One embodiment", "an embodiment" or "one or more embodiments" in this specification means that specific features, structures, or characteristics described in conjunction with said embodiment are included in at least one embodiment of the disclosure. In addition, it should be noted that the expression "in one embodiment" does not definitely refer to the same embodiment.

A great number of specific details are provided in this specification. However, it can be understood that the embodiments of the present disclosure can be implemented even without these specific details. In some embodiments, known methods, structures and techniques are not stated in detail to ensure that the understanding of this specification will not be obscured.

In the Claims, any reference marks should not be construed as limitations of the Claims. The term "comprise" shall not exclude the existence of elements or steps not listed in the Claims. "A/an" or "one" before an element shall not exclude the possibility of multiple said elements. The present disclosure may be implemented by means of hardware comprising a plurality of different elements and a properly programmed computer. In a Claim in which a plurality of devices are listed, several of these devices may be specifically implemented by means of the same hardware. Terms such as "first", "second" and "third" do not indicate any order, and may be interpreted as names.

Finally, it should be noted that the above embodiments are merely used to explain the technical solutions of the present disclosure, and are not intended to limit the present disclosure. Although the present disclosure has been explained in detail with reference to the above embodiments, those ordinarily skilled in the art would appreciate that the technical solutions recorded in these embodiments can still be amended or part of the technical features in these embodiments can be equivalently substituted without causing the essence of corresponding technical solutions to deviate from the spirit and scope of the technical solutions of these embodiments.

The invention claimed is:

1. A haptic feedback substrate, comprising an actuator and a plurality of vibration units connected to the actuator, wherein each of the plurality of the vibration units has a different inherent frequency, the actuator is configured to generate a vibration signal and drive the vibration unit with the inherent frequency being a target inherent frequency to resonate, and a difference between the target inherent frequency and a frequency of the vibration signal is less than or equal to a present threshold;
   wherein each of the plurality of the vibration units comprises a base, a cantilever and a mass block, the mass block is disposed at a center of the vibration unit, the base is disposed around the mass block and is connected to the mass block by the cantilever, and the actuator is disposed on a side of the base;
   wherein a second filler layer is disposed between the bases of two adjacent instances of the plurality of the vibration units, a Young modulus of the second filler layer is less than a Young modulus of the bases, and a thickness of the second filler layer is less than or equal to thickness of the bases.

2. The haptic feedback substrate according to claim 1, wherein the base, the cantilever and the mass block are of an integrated structure.

3. The haptic feedback substrate according to claim 1, wherein the shape of the cantilever is a spiral, an inner circle of the spiral is connected to the mass block, and an outer circle of the spiral is connected to the base.

4. The haptic feedback substrate according to claim 3, wherein the spiral is an Archimedean spiral.

5. The haptic feedback substrate according to claim 1, wherein the cantilever is an L-shaped arm, a long arm of the L-shaped arm is connected to the base, and a short arm of the L-shaped arm is connected to the mass block.

6. The haptic feedback substrate according to claim 5, wherein the shape of the mass block is a polygon, and connection points of the L-shaped arm and the mass block are located at vertexes of the polygon.

7. The haptic feedback substrate according to claim 1, wherein the shape of the base is a polygon, and connection points of the cantilever and the base are vertexes of the polygon or midpoints of side edges of the polygon.

8. The haptic feedback substrate according to claim 7, wherein the vibration unit further comprises a ring structure disposed between the mass block and the base, and the ring structure encircles the mass block and is connected to the mass block by the cantilever.

9. The haptic feedback substrate according to claim 8, wherein in a normal direction of the ring structure encircling the mass block, a width of the ring structure is greater than or equal to 0.1 mm and less than or equal to 1 mm.

10. The haptic feedback substrate according to claim 8, wherein when a plurality of the ring structures are provided, a distance between two adjacent instances of the plurality of the ring structures is greater than or equal to 0.1 mm and less than or equal to 1 mm.

11. The haptic feedback substrate according to claim 8, wherein the quantity of the ring structures is less than or equal to 20.

12. The haptic feedback substrate according to claim 1, wherein in a direction parallel to a plane where the haptic feedback substrate is located, a diameter of the mass block is greater than or equal to 1 mm and less than or equal to 50 mm.

13. The haptic feedback substrate according to claim 1, wherein a first filler layer is disposed in gaps between the base, the cantilever and the mass block in the vibration unit, a Young modulus of the first filler layer is less than a Young modulus of the base, and a thickness of the first filler layer is less than or equal to a thickness of the base.

14. A haptic feedback substrate, comprising an actuator and a plurality of vibration units connected to the actuator, wherein each of the plurality of the vibration units has a different inherent frequency, the actuator is configured to generate a vibration signal and drive the vibration unit with the inherent frequency being a target inherent frequency to resonate, and a difference between the target inherent frequency and a frequency of the vibration signal is less than or equal to a present threshold;
　　wherein each of the plurality of the vibration units comprises a base, a cantilever and a mass block, the mass block is disposed at a center of the vibration unit, the base is disposed around the mass block and is connected to the mass block by the cantilever, and the actuator is disposed on a side of the base;
　　wherein a first fixing layer is disposed on a side, close to the actuator, of the base and is arranged close to a first edge of the base, the first edge is an edge, away from the mass block, of the base, the first fixing layer forms an evasion area on the base, the actuator is located in the evasion area, and a Young modulus of the first fixing layer is greater than a Young modulus of the base.

15. A haptic feedback substrate, comprising an actuator and a plurality of vibration units connected to the actuator, wherein each of the plurality of the vibration units has a different inherent frequency, the actuator is configured to generate a vibration signal and drive the vibration unit with the inherent frequency being a target inherent frequency to resonate, and a difference between the target inherent frequency and a frequency of the vibration signal is less than or equal to a present threshold;
　　wherein each of the plurality of the vibration units comprises a base, a cantilever and a mass block, the mass block is disposed at a center of the vibration unit, the base is disposed around the mass block and is connected to the mass block by the cantilever, and the actuator is disposed on a side of the base;
　　wherein a second fixing layer is disposed on a side, away from the actuator, of the base and is arranged close to a first edge of the base, the first edge is an edge, away from the mass block, of the base, and a Young modulus of the second fixing layer is greater than a Young modulus of the base.

16. The haptic feedback substrate according to claim 1, wherein the actuator is at least one of a piezoelectric motor, a flat motor and a linear motor.

17. A haptic feedback apparatus, comprising the haptic feedback substrate according to claim 1.

18. A haptic feedback method, wherein the method is applied to the haptic feedback substrate according to claim 1, and the method comprises:
　　controlling the actuator to generate a vibration signal, and driving the vibration unit with an inherent frequency being a target inherent frequency to resonate, wherein a difference between the target inherent frequency and a frequency of the vibration signal is less than or equal to a preset threshold.

* * * * *